UNITED STATES PATENT OFFICE.

THOMAS FRANKLIN MANNS, OF NEWARK, DELAWARE.

PROCESS OF REINFORCING, BACTERIZING, AND COMPOSTING ORGANIC MATERIAL FOR USE AS INOCULATORS, IMPROVERS, AND FERTILIZER OF SOILS.

1,320,701.
Specification of Letters Patent.
Patented Nov. 4, 1919.

No Drawing.    Application filed October 13, 1915. Serial No. 55,640.

*To all whom it may concern:*

Be it known that I, THOMAS F. MANNS, a citizen of the United State, residing at Newark, in the county of New Castle and State of Delaware, have invented certain new and useful Improvements in Processes of Reinforcing, Bacterizing, and Composting Organic Materials for Use as Inoculators, Improvers, and Fertilizer of Soils, of which the following is a specification.

This invention relates to a process of reinforcing, bacterizing, and composting organic material, such as peat, muck, manure, and the like for use as a soil inoculator, soil mellower, plant stimulator and fertilizer.

I have discovered that peat, muck, manure, weed compost or other organic material can be transformed into a fertilizer containing an accumulation of nitrate nitrogen by bacterial action and a humus content having a high stimulative influence on plant life and possessing great value as a plant food, a soil improver and fertilizer, by reinforcing or adding to the organic matter, phosphorus in the form of basic slag, or potassium, sodium or calcium phosphate, either the neutral or acid forms, but preferably the commercial calcium acid phosphate, and then by the addition of a base, either wood ashes, basic slag, potassium carbonate, calcium carbonate or hydrate, but preferably calcium hydrate with certain amounts of wood ashes, basic slag and potassium carbonate, to neutralize the mixture, and then by bacterizing and composting.

The practice of my process will be described in connection with the treatment of peat but it is to be understood that it is equally applicable to other organic materials.

In the practical application of my process to the treatment of peat there are produced two important products each having a high commercial value. The first product, which I shall refer to herein as the bacterial compost, bacterizer or inoculator, is a rich compost containing all the known beneficial soil bacteria. This product, when partially air dried without destroying the beneficial organisms contained therein, is used to abundantly inoculate the second product which is peat or other organic matter sufficiently dried, and reinforced with proper mineral and organic compounds. The latter product is sent out commercially in a partially dried state which, when moistened in the soil to which it is applied, will set up bacterial action from the thorough inoculation. Soil inoculation and plant stimulation will result bringing high crop response.

In the practical application of my process, in the production of the first product, viz., the bacterial compost or bacterizer, I add to peat or other organic matter, a phosphate, either the neutral or acid phosphates of sodium, potassium or calcium or Thomas slag, but preferably a sixteen per cent. (16%) commercial calcium acid phosphate, and a sufficient quantity of some alkali metal or alkaline earth metal compound to neutralize the product, such as basic slag, calcium, sodium, or potassium carbonate, or the hydrates of these alkalis or alkaline earths, but preferably a mixture of calcium carbonate, calcium hydrate, basic slag and wood ashes, to which entire mixture is added a quantity of a carbohydrate such as molasses or sugar and protein matter such as dried blood, tankage, cottonseed meal or similar organic matter. At the time of mixing, the proper bacterial flora is supplied through a mixture of soils known to contain an abundance of the desired organisms. In case the soils used are deficient in any of the desired legume organisms pure cultures may be used.

I have found that a satisfactory compost will result from a mixture of peat, calcium phosphate or calcium acid phosphate, and calcium carbonate, or a mixture of substantially equal parts of calcium carbonate and calcium hydrate and inoculated soils in the following proportions:

Peat _____ 1 ton.
Commercial calcium acid phosphate_ 50 lbs.
Calcium hydrate_____ 50 lbs.
Soils, well inoculated_____ 25 lbs.

In my experiments with my process I have found it advantageous to add the alkali metal or alkaline earth metal salts in sufficient quantity to overcome the acidity of the acid phosphate added and the peat or other organic material under treatment. I have also found that improved results may be obtained by the use of additional mineral materials, such for example as potassium salts, notably potassium chlorid, potassium sulfate and potassium carbonate, wood ashes and Thomas slag. I have also found it advantageous to add to the mixture of peat and mineral matter a liberal amount of molasses or sugar, and dried blood, preferably 30 pounds of the former and 10 pounds of the latter to each ton of organic matter.

I have obtained particularly advantageous results in my bacterial compost or bacterizer, from the use of peat, calcium, acid phosphate (commercial) calcium phosphate (commercially known as "floats"), calcium hydrate, calcium carbonate, wood ashes, Thomas slag, molasses and dried blood, and properly inoculated soil in the following proportions by weight:

| | |
|---|---|
| Peat | 1 ton. |
| Calcium acid phosphate | 5 lbs. |
| Rock phosphate (known commercially as "floats") | 50 lbs. |
| Calcium hydrate | 20 lbs. |
| Calcium carbonate (ground limestone) | 100 lbs. |
| Wood ashes | 200 lbs. |
| Thomas slag | 10 lbs. |
| Dried blood | 10 lbs. |
| Molasses (or cane sugar 25 lbs) | 30 lbs. |
| Well inoculated soil | 25 lbs. |

The peculiar efficiency of this bacterial compost is believed to be due primarily to the well balanced mixture containing all the ingredients or compounds needed for the intended purpose, such ingredients being properly proportioned to give rapid growth to each of the groups of beneficial soil bacteria. I obtain a further advantage from the inoculating material which I employ. This inoculating material is preferably selected soils from widely different areas of the United States, definitely proven for their efficiency in regard to certain physiological activity, (for example, nitrogen fixation; cellulose destruction in which the cellulose becomes food for further bacterial action; the changing of organic nitrogen compounds to ammoniacal and nitric nitrogen). Some of the sources of this inoculating material are as follows: For azotobacter, that is the non-symbiotic nitrogen fixing organisms, and nitrosomonas and nitrobacter, the former oxidizing ammonia to nitrite, and the latter completing the oxidation to nitrate, I use the active azo or nitrogen fixing soils of Colorado and North Dakota, those soils bordering on the so called "niter-spots". For introducing the cellulose destroyers B. rossica and related bacteria I use a mixture of rapidly composting manure or a soil known to be high in these organisms. For introducing the ammonifiers I use a soil of high ammonifying efficiency as proven by the destruction of paper, inserted therein. For introducing the legume bacteria I use a well inoculated soil upon which has grown the particular legume for which the inoculation is introduced. Recent scientific knowledge (Bulletin 184, Kentucky Aug. 1914) and (Centralblatt für Bakt. 40 Bd. No. 11-13—Mar. 1914) has shown that there are only nine species of B. radicicola and six of these species or physiological groups cover the inoculation of the most important agricultural legumes. So in practice I employ thoroughly inoculated soil from a legume of each of the six groups, thereby introducing inoculation for all the important agricultural legumes in the one compost. In practice this material has been found superior to the so called "pure culture legume inoculating material." In practice, when it is difficult to obtain the soil well inoculated for the particular legume, I use a pure culture for the same purpose, though the soil gives superior results. In practice I find this product to give thorough inoculation to the following legumes, viz: alfalfa, sweet clover (white), sweet clover (yellow), black medic or yellow trefoil, bur clover, red clover, mammoth clover, alsike clover, white clover, soy beans, cow peas, sweet peas, spring vetch, garden peas, Canada field peas, lima beans, navy beans, velvet beans, and the various other legumes commonly grown as soil improvers.

In practice the peat or other organic matter to be composted, the reinforcing and balancing minerals and compounds (excepting the calcium hydrate which is added to the well diluted mixture of molasses), the dried blood and the inoculated soil which in the preferred embodiment of my invention contains all the beneficial bacteria herein before specified, are thoroughly mixed by hand using shovels, or the whole mixture is passed through any efficient fertilizer mixer; the material is then spread out and the solution of molasses containing the lime hydrate is evenly sprayed on, then the material is spread out to a depth of preferably from two to four feet and moistened down by a Skinner irrigation system or other means of watering and allowed to undergo aerobic composting for two weeks to three months. The product is examined from time to time, and when the bacterial flora has reached the growth required the product is ready for use for field, lawn or garden inoculation, for legume inoculation, and for inoculating the commercially reinforced and balanced peat. The product may be used as a soil in green houses, conservatories, or homes. Also in fields as a general fertilizer, soil inoculator and soil improver.

In practice the composting operation may be advantageously concluded when B. radicicola is found to be present to the number of approximately 200 billions per pound of the moist compost. It has been found in practice that when *B. radicicola* has developed to the extent indicated, the azotobacters are present in approximately 50 billions per pound of moist compost and nitrosomonas and nitrobacter are present in approximately 25 billions. The ammonifiers and cellulose destroyers approach the latter numbers viz., about 25 billions per pound of moist compost.

It has been found that the addition of mineral materials herein before referred to, particularly in the proportions specified, produce a balanced material and a bacterial medium particularly suitable for the growth of a well balanced and efficient bacterial flora in which each of the beneficial groups keep pace with one another in an environment conducive to symbiotic relationship.

It has been found in practice that in two weeks of composting a considerable quantity of nitrate nitrogen is formed, equivalent ordinarily to over one pound of nitrates to each ton of compost. Likewise I have found in practice an accumulation of nitrogen by the activity of the nitrogen fixing organisms, equivalent ordinarily to about one pound of high protein matter per ton of compost in one month. The addition of the alkali or alkaline earth metal phosphate and the other ingredients mentioned in the particular mixture above set forth produces a particularly favorable condition in the medium or material for the rapid and extensive development of *B. radicicola*, *Azotobacter chroococcum* and related bacteria, nitrosomonas and nitrobacter, all organisms of great importance to agriculture, in a desired and particularly advantageous relationship as to the development of each.

In the practice of my process I have found that there is a close symbiosis between *B. radicicola* and *Azotobacter chroococcum* and especially that the gummy or gelatinous exude of *B. radicicola* is a favorable medium in which to develop.

My second product consists in reinforced or balanced peat that has been inoculated or bacterized with the bacterial compost or bacterizer. This second material or reinforced and inoculated or bacterized peat is not composted previous to placing it on the market. The reinforcement or addition of mineral and organic compounds make it at once a valuable fertilizer and a favorable medium for bacterial development, as soon as it is moistened. In the practical application of my process in producing this product, the peat is partially dried, preferably by movement over a rotary drier, it is then ground fine, and the reinforcing material added. This material is added in sufficient quantity to make the product an immediately responsive fertilizer and at the same time a very favorable medium or food for the rapid development of the beneficial bacteria which have been applied. My second mixture is preferably made in approximately the following proportions:

| | |
|---|---|
| Peat | 1800 lbs. |
| High grade tankage | 40 lbs. |
| Floats (ground rock phosphate) | 60 lbs. |
| Acid phosphate (commercial 16% acid phosphate) | 20 lbs. |
| Wood ashes (8% potash) | 100 lbs. |
| Lime hydrate | 20 lbs. |
| Nitrate of soda (18% nitrate) | 10 lbs. |
| Granulated sugar | 3 to 10 lbs. |
| Bacterial compost or bacterizer | 50 lbs. |

In practical application this product is found to give to plants a high fertilizing response. It is very effective in mellowing heavy clays and retaining moisture and holding together sands. It is especially efficient on lawn and turfs. It is also highly stimulating to field crops, such as wheat, other grains and grasses and is very valuable as a truck crop stimulator. It has been found in practice to give thorough inoculation to all soils to which applied and all agricultural legumes take a thoroughly satisfactory inoculation. This is an advantage which it is believed is not possessed by any other single material intended for the same purpose.

The cost of the ingredients employed in my process and the inexpensiveness of the operation makes it possible in practice to sell this product commercially at such a low price per ton that it may be used freely as a field fertilizer as well as a soil inoculator and a soil improver.

It is to be understood that the present invention is not restricted to the illustrative examples herein before set forth, it being understood that known equivalents of the materials may be used, nor to the proportions of the ingredients specified nor to the exact details of procedure set forth, it being understood that these may be varied without departing from the spirit of my invention or the scope of the subjoined claims.

Having thus described the invention, I claim:—

1. The herein described process of producing a bacterial compost or bacterizer containing organisms necessary for the inoculation of the different agricultural legumes which consists in mixing peat-like organic material of the character specified, a phosphate, a base in sufficient amount to produce a substantially neutral mixture, protein matter and carbo-hydrate matter, inoculating the mixture with azotobacters, *B. radicicola*, nitrobacters, and *B. rossica*, and composting the mixture, 2. The herein described process of producing a bacterial compost or bacterizer containing organisms necessary for the inoculation of the different agricultural legumes which consists in adding to peat-like organic material of the character specified, a phosphate, a base in sufficient amount to produce a substantially neutral mixture, dried blood and sugar, inoculating the mixture with azotobacters, *B. radicicola*, nitrobacters, and *B. rossica*, and composting the mixture.

3. The herein described process of producing a bacterial compost or bacterizer containing organisms necessary for the inoculation of the different agricultural legumes which consists in thoroughly mixing unsterilized peat, a phosphate, a base in sufficient amount to produce a substantially neutral mixture, dried blood and sugar, inoculating the mixture by the addition thereto of a mixture of soils well inoculated with azotobacters, *B. radicicola*, nitrobacters, and *B. rossica*, and composting the mixture.

4. The herein described process of producing a bacterial compost or bacterizer containing organisms necessary for the inoculation of the different agricultural legumes which consists in thoroughly mixing peat, calcium acid phosphate, calcium hydrate, sugar and dried blood in approximately the following proportions: peat 1 ton, calcium acid phosphate 50 lbs., calcium hydrate 50 lbs., sugar 25 lbs., and dried blood 10 lbs., inoculating the mixture with azotobacters, *B. radicicola*, nitrosomonas, nitrobacters, and *B. rossica*, and composting the mixture.

5. The herein described process of producing a bacterial compost or bacterizer containing organisms necessary for the inoculation of the different agricultural legumes which consists in thoroughly mixing peat, calcium acid phosphate, rock phosphate, calcium hydrate, calcium carbonate, wood ashes, Thomas slag, sugar and dried blood, inoculating the mixture with azotobacters, *B. radicicola*, nitrosomonas, nitrobacters, and *B. rossica*, and composting the mixture.

6. The herein described process of producing a bacterial compost or bacterizer containing organisms necessary for the inoculation of the different agricultural legumes which consists in thoroughly mixing peat and the following materials in substantially the proportions specified: to each ton of peat, calcium acid phosphate 5 lbs., rock phosphate 50 lbs., calcium hydrate 20 lbs., calcium carbonate 100 lbs., wood ashes 200 lbs., Thomas slag 10 lbs., sugar 25 lbs., and dried blood 10 lbs., inoculating the mixture with azotobacters, *B. radicicola*, nitrosomonas, nitrobacters, and *B. rossica*, and composting the mixture.

7. The herein described process of producing a bacterial compost or bacterizer containing organisms necessary for the inoculation of the different agricultural legumes which consists in adding to peat-like organic material of the character specified, a phosphate, a base in sufficient amount to produce a substantially neutral mixture, carbo-hydrate matter and protein matter, inoculating the mixture with organisms of a plurality of groups of beneficial soil bacteria, composting the mixture, and adding a portion of the resulting product to a mixture of peat-like organic material of the character specified, rock phosphate, calcium acid phosphate, wood ashes, calcium hydrate, sodium nitrate, carbo-hydrate and protein matter.

8. The herein described process of producing a bacterial compost or bacterizer containing organisms necessary for the inoculation of the different agricultural legumes which consists in thoroughly mixing peat and the following materials in substantially the proportions specified; to one ton of peat, calcium acid phosphate 5 lbs., rock phosphate 50 lbs., calcium hydrate 20 lbs., calcium carbonate 100 lbs., wood ashes 200 lbs., Thomas slag 10 lbs., sugar 25 lbs., and dried blood 10 lbs., inoculating the mixture by adding a mixture of soils well inoculated with azotobacters, *B. radicicola*, nitrosomonas nitrobacters, and *B. rossica*, composting the mixture and adding a portion of the product to a mixture of peat with the following materials, in substantially the proportions specified: to 1800 lbs. of peat, rock phosphate 60 lbs., commercial calcium acid phosphate 20 lbs., sodium nitrate 10 lbs., granulated sugar, 3 to 10 lbs., high grade tankage 40 lbs.

9. The herein described bacterial compost or bacterizer containing organisms necessary for the inoculation of the different agricultural legumes, containing peat, a phosphate, a base in sufficient amount to produce a substantially neutral mixture, protein matter and carbo-hydrate matter, such material being thoroughly inoculated with azotobacters *B. radicicola*, nitrosomonas, nitrobacters and *B. rossica*.

10. The herein described bacterial compost or bacterizer containing organisms necessary for the inoculation of the different agricultural legumes, comprising peat, commercial calcium acid phosphate, calcium hydrate, sugar and dried blood in substantially the following proportions: peat, one ton, calcium acid phosphate 50 lbs., calcium hydrate 20 lbs., sugar 25 lbs., dried blood 10 lbs., said material being thoroughly inoculated with azotobacters, *B. radicicola*, nitrosomonas, nitrobacters, and *B. rossica*.

11. The herein described bacterial compost or bacterizer, containing organisms necessary for the inoculation of the different agricultural legumes, containing the following materials in substantially the proportions specified: peat 1 ton, commercial calcium acid phosphate 5 lbs., rock phosphate 50 lbs., calcium hydrate 20 lbs., calcium carbonate 100 lbs., wood ashes 200 lbs., Thomas slag 10 lbs., sugar 25 lbs., protein matter 10 lbs., the material being well inoculated with azotobacters, *B. radicicola*, nitrosomonas, nitrobacters, and *B. rossica*.

In testimony whereof I affix my signature in presence of two witnesses.

THOMAS FRANKLIN MANNS.

Witnesses:
Mrs. ALYS MANNS,
M. R. APSLEY.